US010773798B2

(12) United States Patent
Haldeman et al.

(10) Patent No.: US 10,773,798 B2
(45) Date of Patent: Sep. 15, 2020

(54) ROTOR HUB WITH BLADE-TO-BLADE DAMPERS ATTACHED TO THE PITCH CHANGE AXIS

(71) Applicant: Bell Helicopter Textron Inc., Fort Worth, TX (US)

(72) Inventors: Andrew Paul Haldeman, Fort Worth, TX (US); Dalton T. Hampton, Fort Worth, TX (US); Bryan Marshall, Mansfield, TX (US); Frank Bradley Stamps, Colleyville, TX (US)

(73) Assignee: Bell Textron Inc., Fort Worth, TX (US)

( * ) Notice: Subject to any disclaimer, the term of this patent is extended or adjusted under 35 U.S.C. 154(b) by 247 days.

(21) Appl. No.: 15/720,626

(22) Filed: Sep. 29, 2017

(65) Prior Publication Data

US 2019/0100300 A1   Apr. 4, 2019

(51) Int. Cl.
| | |
|---|---|
| *B64C 27/39* | (2006.01) |
| *B64C 27/00* | (2006.01) |
| *B64C 27/605* | (2006.01) |
| *B64C 27/72* | (2006.01) |
| *B64C 27/48* | (2006.01) |
| *B64C 27/06* | (2006.01) |

(52) U.S. Cl.
CPC ............ *B64C 27/001* (2013.01); *B64C 27/39* (2013.01); *B64C 27/48* (2013.01); *B64C 27/605* (2013.01); *B64C 27/72* (2013.01); *B64C 27/06* (2013.01); *B64C 2027/7255* (2013.01)

(58) Field of Classification Search
CPC .......... B64C 2027/7255; B64C 27/001; B64C 27/06; B64C 27/39; B64C 27/48; B64C 27/605; B64C 27/72; B64C 27/51; B64C 27/32; B64C 27/635; B64C 2027/003
USPC ....................................... 244/17.25
See application file for complete search history.

(56) References Cited

U.S. PATENT DOCUMENTS

| | | | | | |
|---|---|---|---|---|---|
| 2,853,141 | A | * | 9/1958 | Leoni ................. | B64C 27/39 416/106 |
| 4,342,540 | A | * | 8/1982 | Lovera ............... | B64C 27/35 416/107 |
| 4,915,585 | A | * | 4/1990 | Guimbal ............. | B64C 27/51 416/107 |
| 5,636,970 | A | * | 6/1997 | Certain .............. | B64C 27/51 416/106 |
| 5,913,659 | A | * | 6/1999 | Doolin ............... | B64C 27/008 267/141.4 |
| 6,036,442 | A | * | 3/2000 | Certain .............. | B64C 27/50 416/143 |

(Continued)

FOREIGN PATENT DOCUMENTS

CA     3017372 A1 *  3/2019   ............ B64C 27/06

*Primary Examiner* — Claude J Brown
(74) *Attorney, Agent, or Firm* — Lightfoot & Alford PLLC

(57) ABSTRACT

An aircraft rotor assembly has a yoke and a plurality of rotor blade assemblies coupled thereto. Each of the rotor blade assemblies include a rotor blade, a bearing, and a blade grip coupling the rotor blade to the bearing. Each of the rotor blades is rotatable about a lead-lag axis, flap axis, and a pitch change axis, wherein all the axes intersect within the bearing. Adjacent pairs of rotor blade assemblies are coupled together via a damper assembly that is coupled to the pitch change axis of each of the rotor blade assemblies.

11 Claims, 9 Drawing Sheets

(56) References Cited

U.S. PATENT DOCUMENTS

| | | | | |
|---|---|---|---|---|
| 6,200,097 B1* | 3/2001 | Mouille | ............ | B64C 27/32 |
| | | | | 416/107 |
| 8,123,483 B2 | 2/2012 | Beroul | | |
| 8,695,917 B2* | 4/2014 | Cranga | ............ | B64C 27/001 |
| | | | | 188/379 |
| 9,457,898 B2* | 10/2016 | Russell | ............ | B64C 27/51 |
| 2001/0051096 A1* | 12/2001 | Potdevin | ............ | B64C 27/50 |
| | | | | 416/95 |
| 2006/0120873 A1* | 6/2006 | D'Anna | ............ | B64C 27/50 |
| | | | | 416/221 |
| 2007/0071602 A1* | 3/2007 | Beroul | ............ | B64C 27/32 |
| | | | | 416/143 |
| 2008/0159862 A1* | 7/2008 | Beroul | ............ | B64C 27/35 |
| | | | | 416/140 |
| 2010/0247288 A1* | 9/2010 | Russell | ............ | B64C 27/35 |
| | | | | 415/1 |
| 2010/0247312 A1* | 9/2010 | Girard | ............ | B64C 27/35 |
| | | | | 416/134 A |
| 2011/0236209 A1* | 9/2011 | Louis | ............ | B64C 27/51 |
| | | | | 416/135 |
| 2012/0051909 A1* | 3/2012 | McGuire | ............ | B64C 27/51 |
| | | | | 416/1 |
| 2012/0269630 A1* | 10/2012 | Zoppitelli | ............ | B64C 27/35 |
| | | | | 416/144 |
| 2014/0299709 A1* | 10/2014 | D'Anna | ............ | B64C 7/00 |
| | | | | 244/17.25 |
| 2015/0251753 A1* | 9/2015 | Jarrett | ............ | B64C 27/35 |
| | | | | 416/104 |
| 2017/0129598 A1* | 5/2017 | Stucki | ............ | B64C 27/48 |

* cited by examiner

ROTOR HUB WITH BLADE-TO-BLADE DAMPERS ATTACHED TO THE PITCH CHANGE AXIS

BACKGROUND

When a helicopter is flying horizontally, or hovering in the wind, differing relative wind speeds cause the rotating blades to experience differing horizontal forces throughout each rotation. For example, during forward flight, when the blade is advancing it is encountering a larger relative air speed than when the blade is retreating. Accordingly, each blade experiences large and varying moments in the leading and lagging directions. Rather than rigidly attaching blades to a yoke and forcing the yoke to absorb the large varying moments, the blades may be attached to the yoke via a lead-lag hinge which has an axis of rotation substantially parallel to the mast axis. In order to prevent the blades from rotating too far back and forth about the lead-lag hinge, and to prevent the back and forth movement from matching the resonant frequency of the drive system, dampers may be attached to the blades to provide a resistive force.

The blades also experience large forces in a direction parallel to the lead-lag hinge axis. In order to allow some movement in this direction, a flap hinge may be utilized. The flap hinge attaches the blades to the yoke about an axis perpendicular to the lead-lag hinge axis.

In addition to the optional lead-lag and flap hinges, the blades must be able to collectively and cyclically alter their pitch to enable vertical and horizontal movement of the helicopter. Therefore, each blade must be hinged about a pitch change axis that is generally perpendicular to both the lead-lag hinge and flap hinge axes.

The dampers may be coupled between the blades and the yoke or they may be coupled between adjacent blades, known as blade-to-blade dampers. Blade-to-blade dampers have generally been attached proximate the trailing end of one blade grip and to the leading end of the adjacent blade grip. As such, the attachment points of the dampers are laterally offset from the pitch change axis. When the blades are rotated away from horizontal, any resistive force applied by the damper to the blade causes a rotational moment about the pitch change axis. This moment must be resisted by the flight control system in order to maintain the desired blade pitch. As the blade rotates about the pitch change axis, the effective length of the lever arm changes, and therefore, so does the moment. This is further complicated by the constantly changing resistive force which also modifies the magnitude of the moment. These constantly changing moments unnecessarily complicate the dynamic analysis required to effectively design and program the flight control system.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure provides a novel rotor hub assembly that simplifies the dynamic analysis required to design and program a flight control system. This is accomplished with a rotor hub assembly that utilizes dampers between adjacent blades to maintain in-plane oscillations below, or above, 1/rev, i.e., below, or above, the resonant frequency of the drive system. The dampers have attachment points that are coincident to the pitch change axes of the blades. In addition, the rotor hub assembly may utilize a single axisymmetric elastomeric spherical bearing for each blade to serve as the lead-lag, flap, and pitch hinges.

Figure 1:
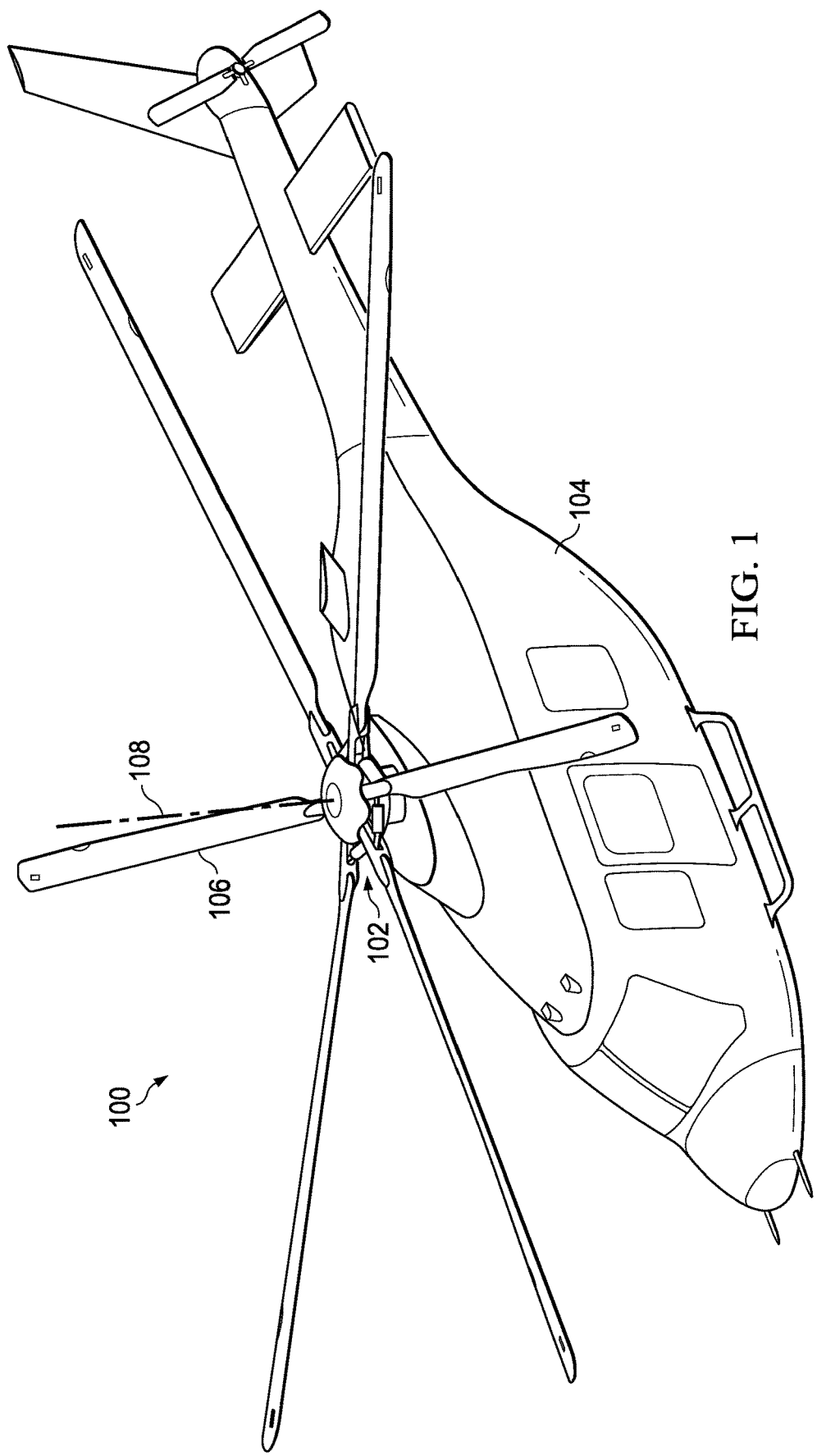
FIG. 1 is an oblique view of an aircraft comprising a rotor assembly according to this disclosure.

FIG. 1 illustrates an aircraft 100 comprising a main rotor assembly 102 according to this disclosure. Aircraft 100 comprises a fuselage 104 and rotor assembly 102 with a plurality of rotor blades 106. Rotor assembly 102 is driven in rotation about a mast axis 108 by torque provided by a powerplant housed within fuselage 104. Though aircraft 100 is shown as a helicopter having a single main rotor, rotor assembly 102 can alternatively be used on other types of aircraft, such as, but not limited to, helicopters having more than one main rotor or on tiltrotor aircraft. Also, rotor assembly 102 is shown as a main rotor for providing vertical lift and having collective and cyclic control, though rotor assembly 102 may alternatively be configured to provide longitudinal or lateral thrust, such as in a helicopter tail rotor or airplane propeller.

Figure 2:
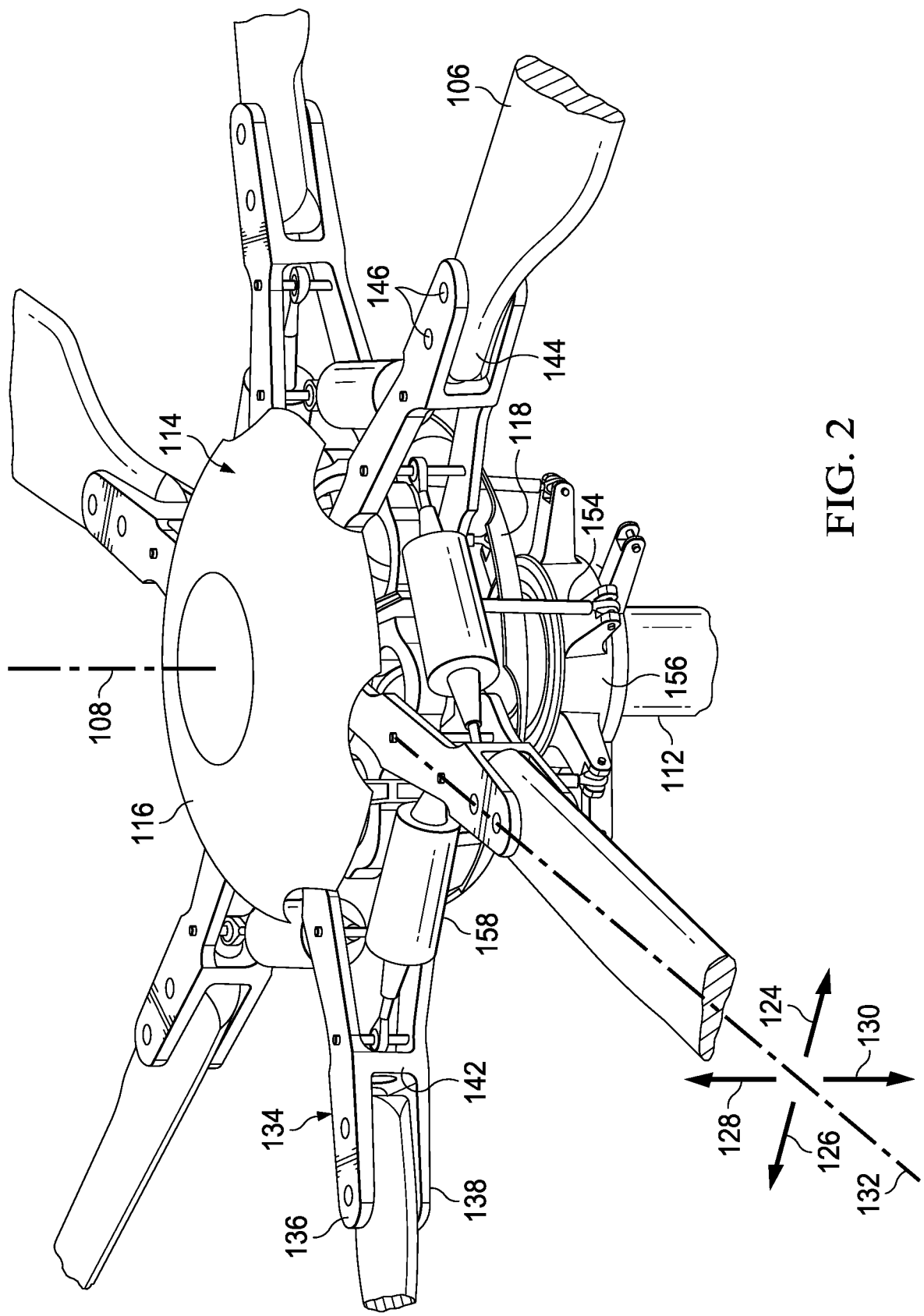
FIG. 2 is an oblique view of a portion of the rotor assembly of FIG. 1.
Figure 3:
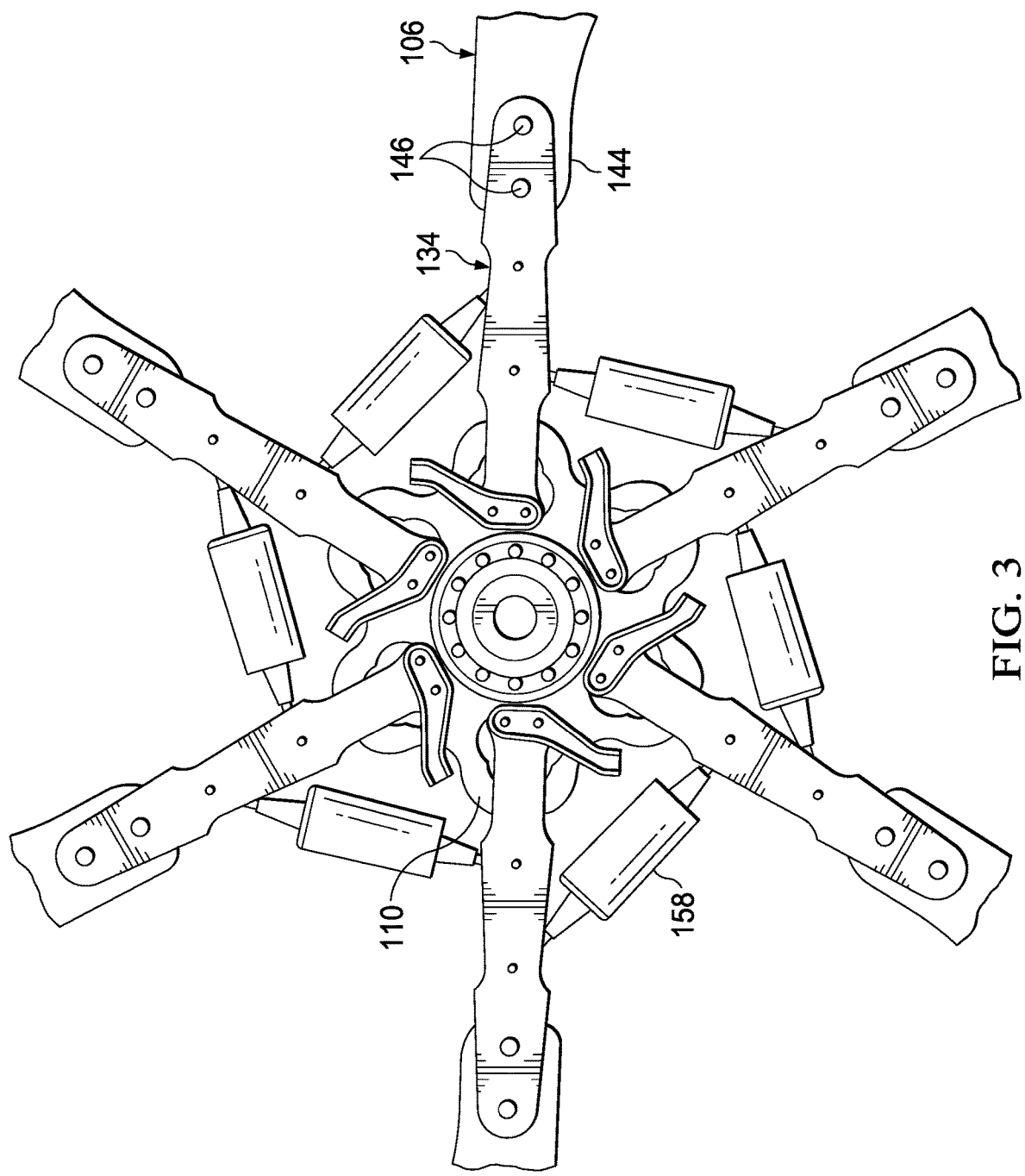
FIG. 3 is a top view of a portion of the rotor assembly of FIG. 1.
Figure 4:
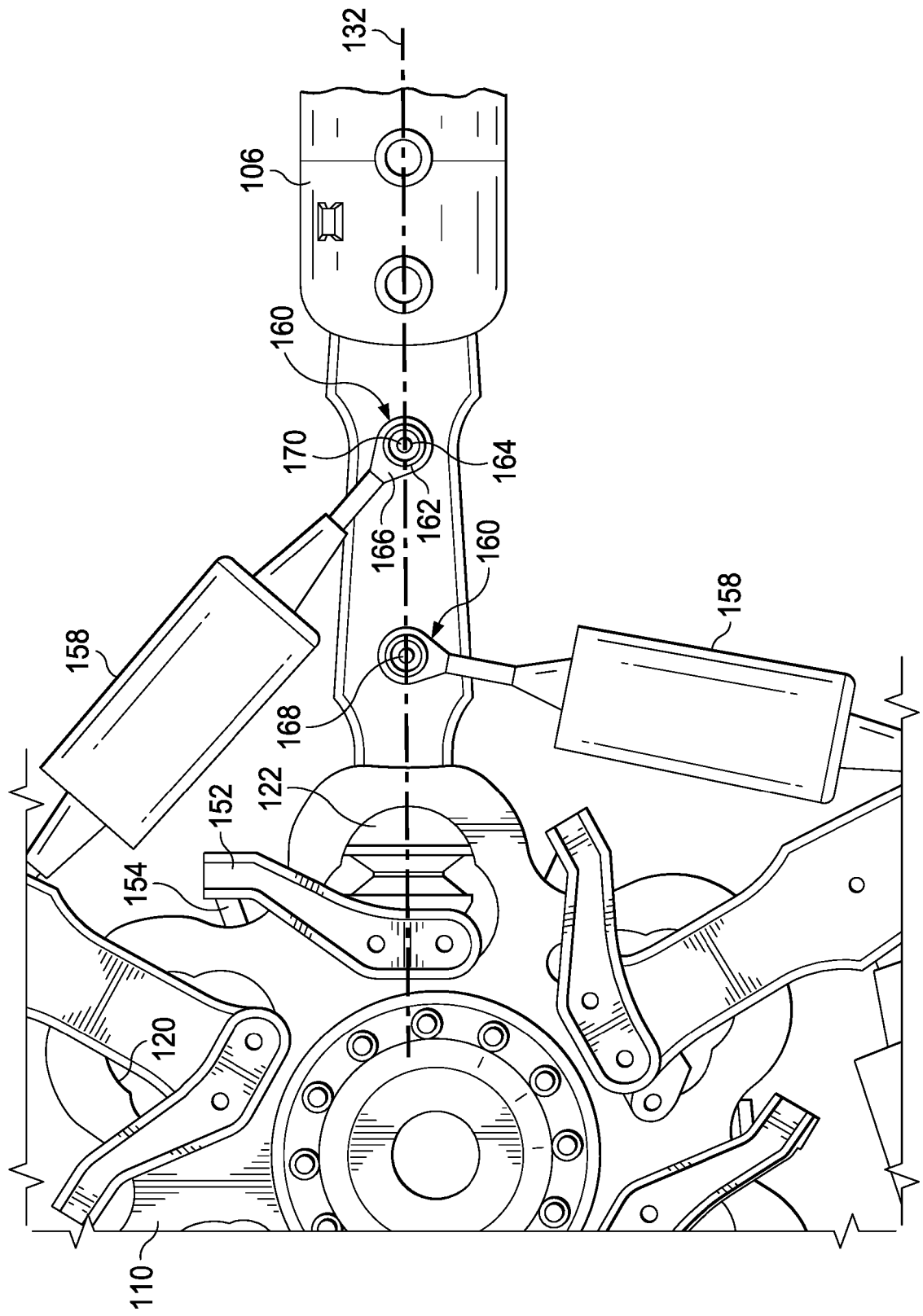
FIG. 4 is a top view of a portion of the rotor assembly of FIG. 1.
Figure 5:
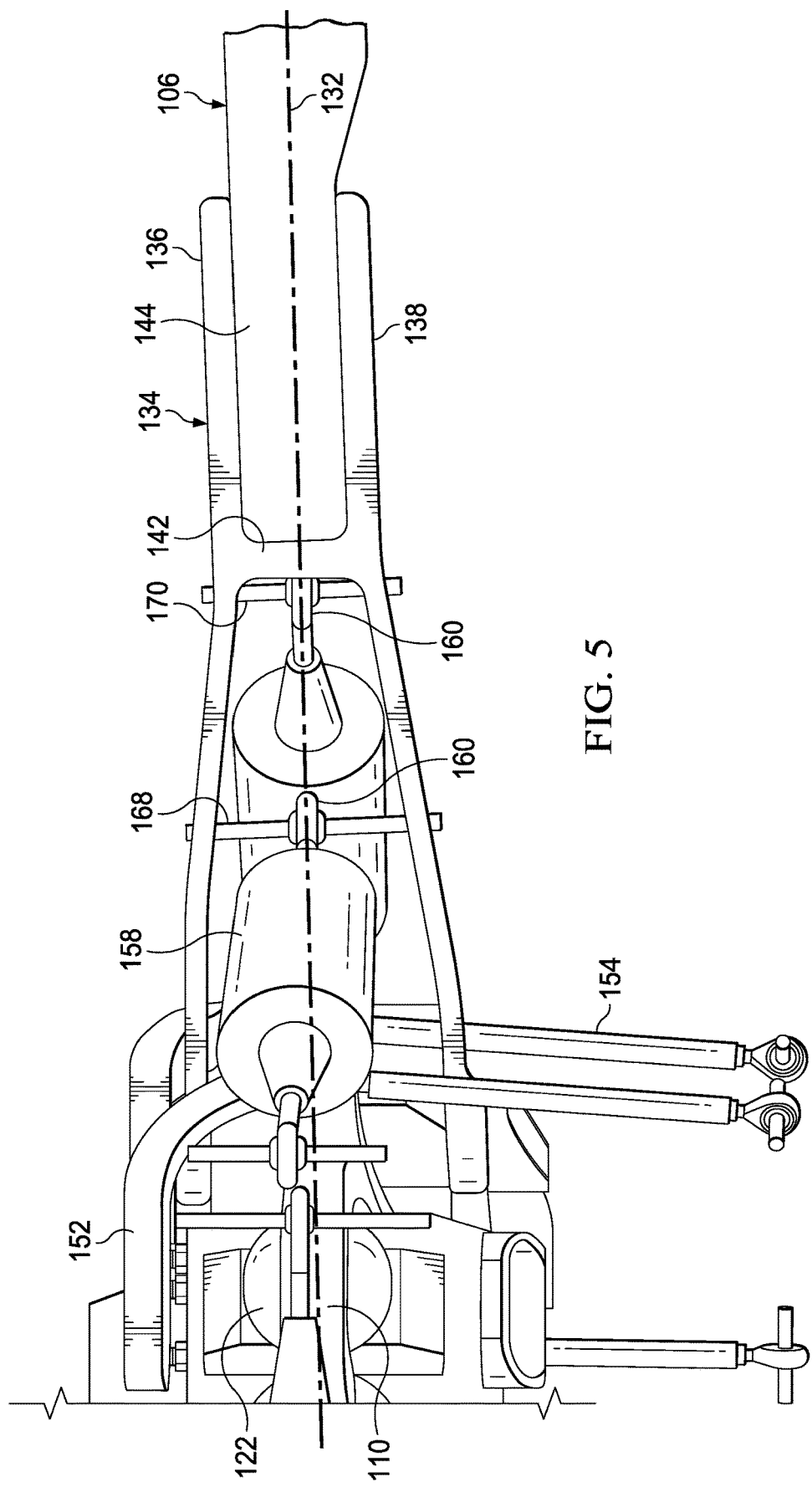
FIG. 5 is a side view of a portion of the rotor assembly of FIG. 1.
Figure 6:
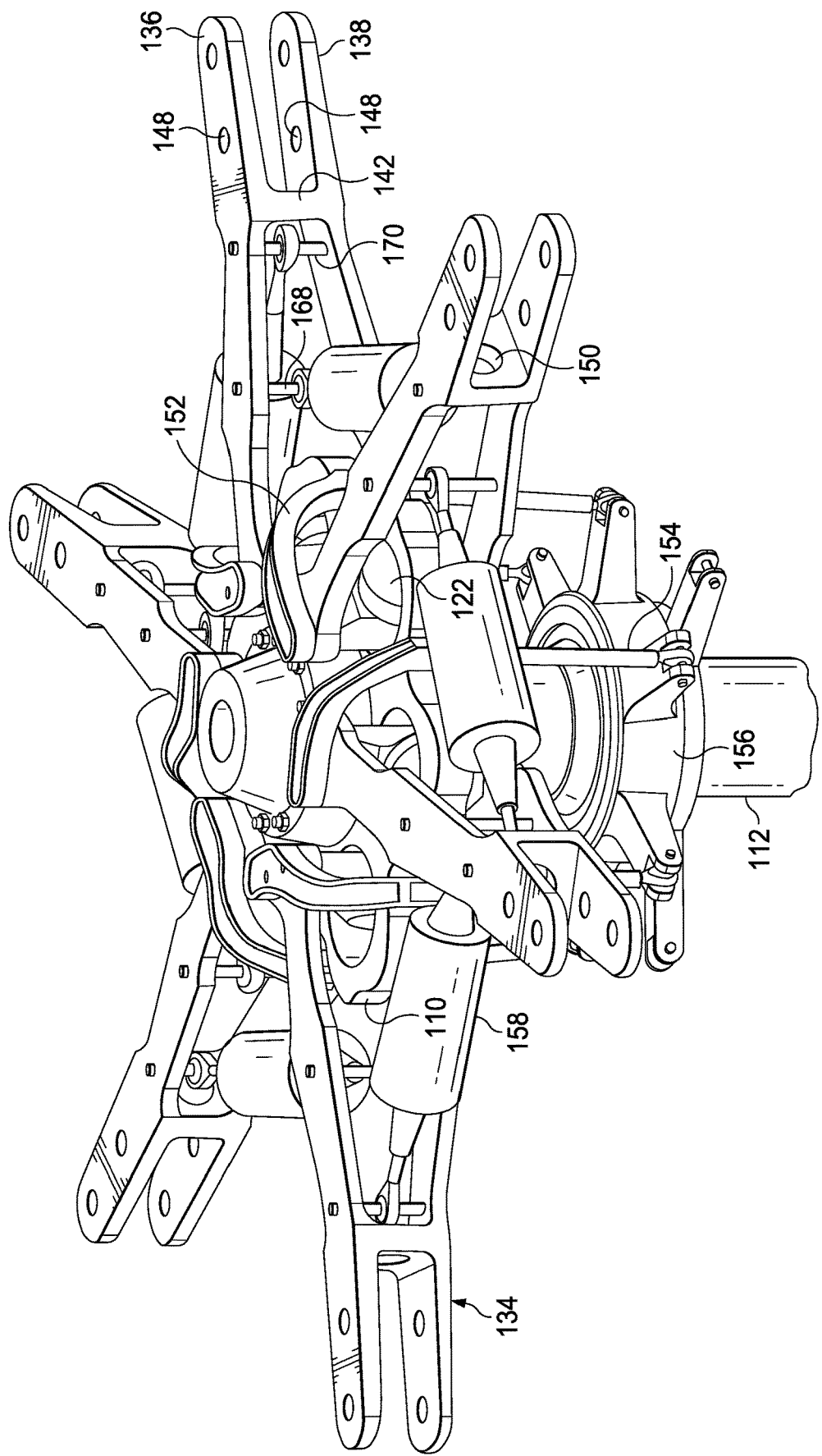
FIG. 6 is an oblique view of a portion of the rotor hub assembly of FIG. 1.
Figure 7:
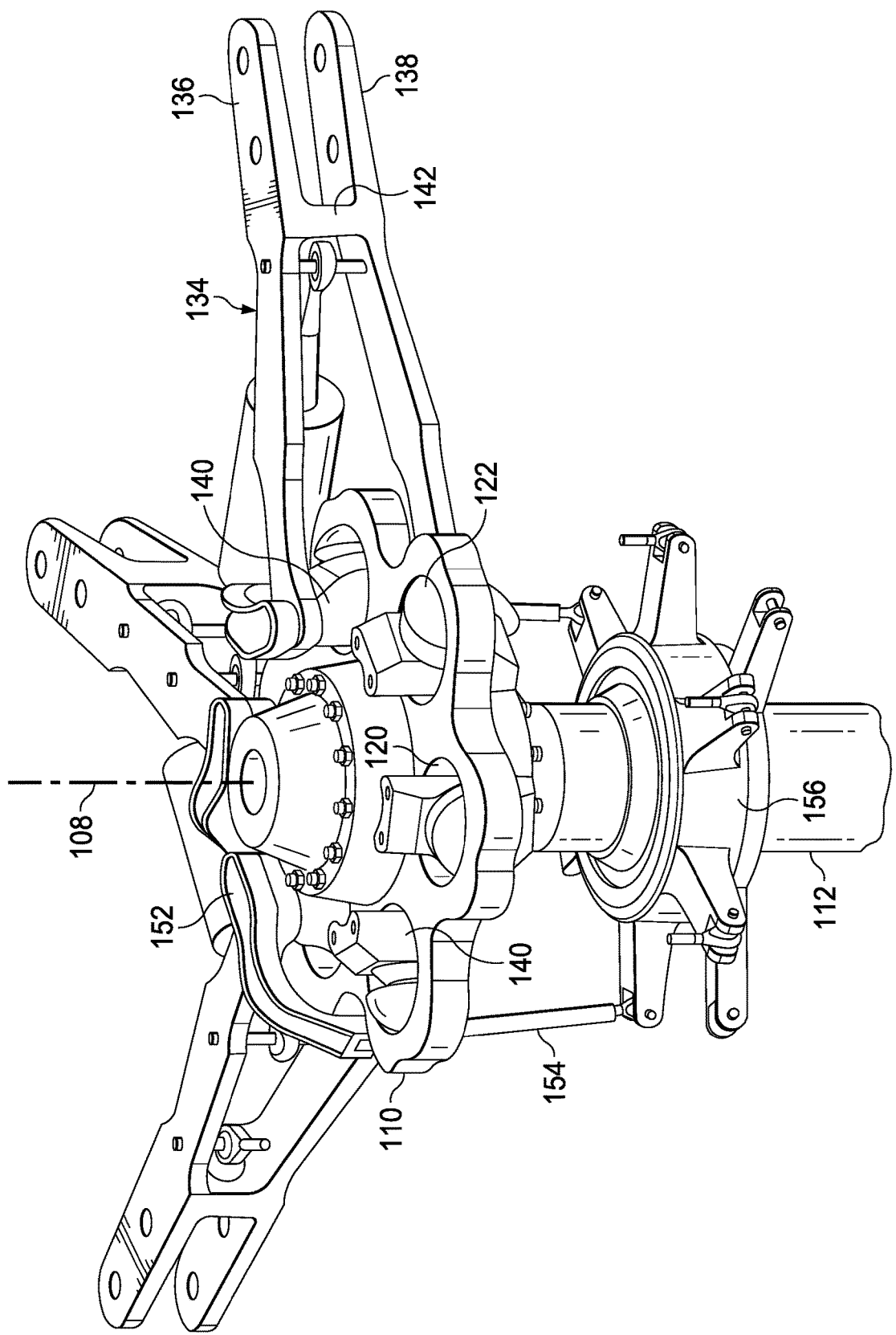
FIG. 7 is an oblique view of a portion of the rotor hub assembly of FIG. 1.

FIGS. 2 through 7 illustrate rotor assembly 102, various components being removed for ease of viewing. A yoke 110 is coupled to a mast 112 for rotation with mast 112 about mast axis 108. Yoke 110 has a honeycomb configuration in the embodiment shown, though in other embodiments, yoke 110 may have a different configuration, such as a central portion with radially extending arms. Yoke 110 is preferably formed from a composite material, such as carbon fiber, though yoke 110 may be formed from any appropriate material. In the embodiment shown, yoke 110 is configured for use with six rotor blades 106, though yoke 110 may be configured for use with any appropriate number of blades. As shown in FIG. 2, yoke 110 may be enclosed by an aerodynamic protective cover 114. Cover 114 may include a top portion 116 and a bottom portion 118.

Yoke 110 has six bearing pockets 120, one bearing pocket 120 corresponding to each rotor blade 106. Each bearing pocket 120 carries a bearing 122, wherein bearing 122 may be an axisymmetric elastomeric spherical bearing as disclosed in and described in U.S. patent application Ser. No. 15/713,277 filed on Sep. 22, 2017, the entirety of which is incorporated herein by reference. Each bearing 122 is spaced a radial distance from mast axis 108 and transfers centrifugal force from the associated rotor blade 106 to yoke 110. Each bearing 122 forms a lead-lag hinge to allow for limited rotation of associated rotor blade 106 relative to yoke 110 in in-plane lead and lag directions about a lead-lag axis, as indicated by arrows 124 and 126, respectively. The lead-lag axis is substantially parallel to mast axis 108 and passes through a center point of each bearing 122. Bearing 122 also forms a flap hinge that allows for limited rotation in out-of-plane flapping directions about a flap axis, as indicated by arrows 128 and 130. The flap axis is substantially perpendicular to the lead-lag axis and also passes through the center point of bearing 122. Each bearing 122 also forms a pitch change hinge that allows for limited rotation about a pitch change axis 132. Pitch change axis 132 is substantially perpendicular to the lead-lag axis and the flap axis and also passes through the center point of bearing 122. While each rotor blade 106 can lead and lag about the associated bearing 122, during operation the centrifugal force tends to force each rotor blade 106 toward a centered, neutral position. It is from this neutral position that each rotor blade 106 can lead, by rotating forward (in the direction of rotation about mast axis 108, indicated by arrow 124) in-plane relative to yoke 110, or lag, by rotating rearward (indicated by arrow 126) in-plane relative to yoke 110.

A blade grip 134 couples each rotor blade 106 to associated bearing 122, each blade grip 134 including an upper plate 136, a lower plate 138, an inner portion 140, and a central portion 142. Inner portion 140 and central portion 142 connect upper and lower plates 136, 138. As shown in the illustrated embodiment, inner portion 140 is a separate component that is coupled to upper and lower plates 136, 138, while central portion 142, upper plate 136, and lower plate 138 comprise a unitary structure. Alternatively, inner portion 140 and central portion 142 may be separate components that are coupled to upper and lower plates 136, 138. Each blade grip 134 is connected to a proximal end 144 of a rotor blade 106 with fasteners 146, thereby allowing loads from each rotor blade 106 to be transferred through blade grip 134 and bearing 122 to yoke 110. Fasteners 146 are inserted through blade attachment openings 148 extending through upper and lower plates 136, 138. Central portion 142 may include an aperture 150 extending therethrough. Proximal end 144 of rotor blade 106 may cooperatively engage central portion 142 and/or aperture 150 to provide additional rigidity between rotor blade 106 and blade grip 134.

A pitch horn 152 is coupled to each blade grip 134, allowing for actuation by a pitch link 154 coupled between pitch horn 152 and a swashplate 156 of a flight control system for causing rotation of blade grip 134 and rotor blade 106 together about pitch change axis 132 for cyclic and collective control of rotor blades 106. Pitch links 154 are oriented generally parallel to mast axis 108 and may be located closer to mast axis 108 than the outermost portion of yoke 110. Alternatively, pitch links 154 may be closer to mast axis 108 than the outermost portion of bearing pockets 120. Such a configuration allows for a more compact, lightweight, aerodynamic rotor assembly. Though not shown, a droop stop limits droop of each rotor blade 106 and blade grip 134 assembly toward fuselage 104 when rotor assembly 102 is slowly rotating about mast axis 108 or at rest.

Each rotor blade 106 is coupled to each adjacent rotor blade 106 by a damper assembly 158, and each damper assembly 158 provides a resistive force and cooperates with each adjacent damper assembly 158 to prevent large oscillations in lead-lag directions 124, 126, and to maintain the frequency of in-plane oscillations below, or above, 1/rev, i.e., below, or above, the resonant frequency of the drive system. Damper assemblies 158 may be simple mono-tube dampers, twin-tube dampers, hysteresis dampers, dry or wet friction dampers, or magnetorheological dampers, wherein a magnetic field may continuously modify the fluid viscosity, and thereby modifying the damping properties. Damper assemblies 158 may provide adjustable or fixed, as well as, linear or nonlinear resistance. A connector, such as a rod end bearing 160, is installed at each end of damper assembly 158. Rod end bearing 160 includes a ball 162 with a hole 164 extending therethrough. Ball 162 is housed within a race 166. Rod end bearing 160 may also include a self-lubricating liner between ball 162 and race 166 or it may include a zerk fitting for the introduction of lubrication between ball 162 and race 166.

To provide for coupling of damper assemblies 158 to blade grips 134, a first shaft 168, located adjacent to yoke 110, and a second shaft 170, located adjacent to rotor blade 106, are rigidly coupled to each blade grip 134 such that first and second shafts 168, 170 intersect pitch change axis 132. First shaft 168 and second shaft 170 are both sized for insertion through a respective hole 164 of ball 162. Each ball 162 is coupled to either first shaft 168 or second shaft 170 at the intersection of the respective shaft with pitch change axis 132. When assembled, each damper assembly 158 can be rotated a limited amount relative to each blade grip 134, allowing for rotor blades 106 to rotate about pitch change axis 132 without materially affecting movement in lead and lag directions 124, 126 relative to each other and to yoke 110. The resistive force of each damper assembly 158 is transferred to each blade grip 134 through associated rod end bearing 160, into first shaft 168 or second shaft 170, and into adjacent blade grip 134 to resist relative motion between blade grips 134 and their associated rotor blades 106. Because rod end bearings 160 are coupled directly to pitch change axis 132, the length of the lever arm between the resistive force and pitch change axis 132 is zero. Therefore, attachment directly to pitch change axis 132 effectively eliminates any rotational moments that may be caused by the transmission of force from damper assembly 158 to blade grip 134. If damper assemblies 158 were coupled a distance away from pitch change axis 132, the forces applied by damper assemblies 158 would induce rotation of rotor blade 106 about pitch change axis 132. Attachment directly to pitch change axis 132 eliminates rotation, and therefore, greatly simplifies the dynamic calculations required to design and program the flight control system. It should be understood that the attachment points of rod end bearings 160 need not be directly on pitch change axis 132, as long as the attachment points are close enough to pitch change axis 132 that the actual lever arm is small enough that the moment created by forces from damper assembly 158 are negligible when performing the required dynamic analysis.

The configuration of rotor assembly 102 allows rotor blades 106 to "pinwheel" relative to yoke 110, in which all rotor blades 106 rotate in the same lead or lag direction 124, 126 relative to yoke 110, and this may especially occur in lag direction 126 during initial rotation about mast axis 108 of rotor assembly 102 from rest. As the centrifugal force on rotor blades 106 builds with their increased angular velocity, rotor blades 106 will rotate forward in the lead direction 124 to their angular neutral position relative to yoke 110. When damper assemblies 158 are configured as shown in FIGS. 1-7, with a first rod end bearing 160 attached to first shaft 168 proximate yoke 110 on a leading blade grip 134 and a second rod end bearing 160 attached to a second shaft 170 proximate rotor blade 106 on a trailing blade grip 134, damper assemblies 158 will provide resistive force to the pinwheeling rotor blades 106. This occurs because second shafts 170 are further away from the lead-lag axis, and therefore, second shafts 170 translate a larger distance from neutral when rotor blades 106 rotate in-plane than do first shafts 168, causing elongation of damper assemblies 158 and the application of a resistive force. The magnitude of the distance between first shaft 168 and second shaft 170 affects the amount of damping force applied during pinwheeling of blades 106. Optionally, the distance between first and second shafts 168, 170 is greater than or equal to the distance between first shaft 168 and an outermost surface of yoke 110. The pinwheel damping provided by staggered damper assemblies 158 eliminates the need to include a filter in the full authority digital engine control (FADEC) to prevent the extremely low in-plane frequency common during pinwheeling from interfering with the engine control frequency.

Figure 8:
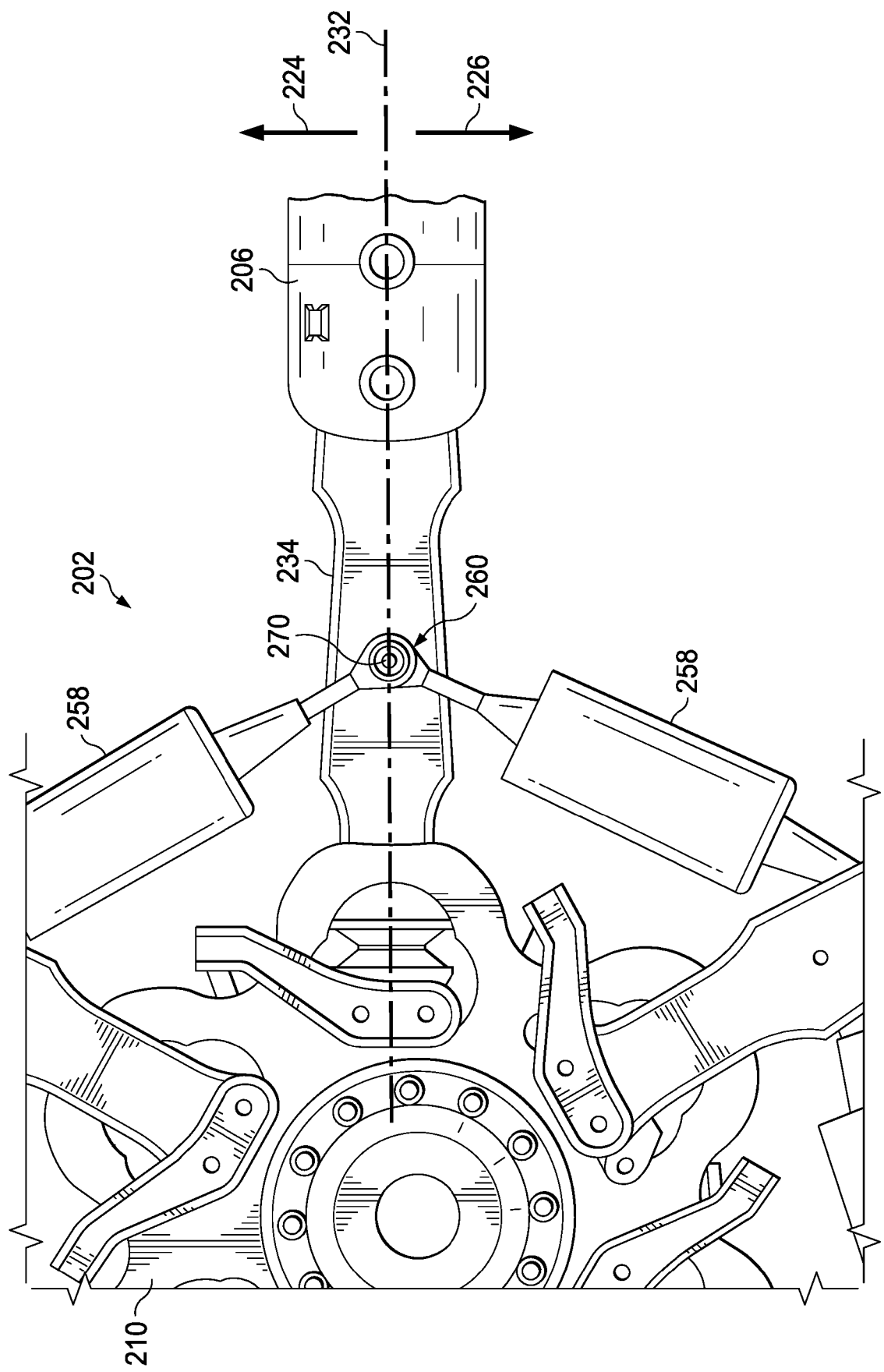
FIG. 8 is a top view of a portion of another rotor assembly according to this disclosure.
Figure 9:
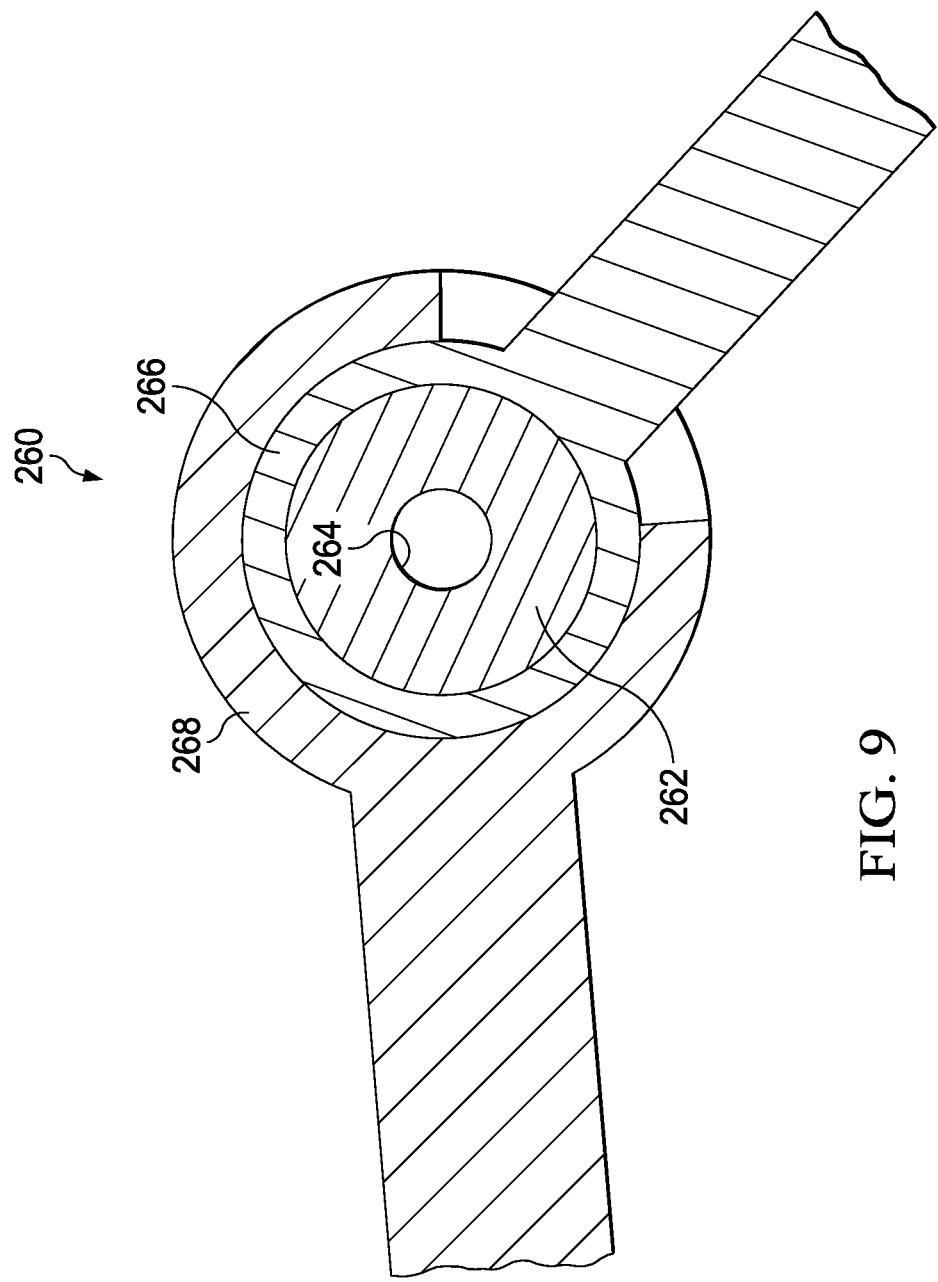
FIG. 9 is a top cross-sectional view of a portion of the rotor assembly of FIG. 9.

Referring to FIGS. 8 and 9, a rotor assembly 202 is shown. Rotor assembly 202 is similar to rotor assembly 102 except that the attachment points of the damper assemblies are not staggered. Rotor assembly 202 includes a yoke 210 configured for use with rotor blades 206. Each rotor blade 206 is coupled to each adjacent rotor blade 206 by a damper assembly 258. Adjacent damper assemblies 258 include a concentric rod end bearing 260, which connects the ends of two adjacent damper assemblies 258. Concentric rod end bearing 260 includes a ball 262 with a hole 264 extending therethrough. Ball 262 is housed within an inner race 266, and inner race 266 is housed within an outer race 268. Inner race 266 has a spherical outer surface configured to freely rotate against a spherical inner surface of outer race 268. Concentric rod end bearing 260 may also include self-lubricating liners between ball 262 and inner race 266, as well as between inner race 266 and outer race 268.

To provide for coupling of damper assemblies 258 to blade grips 234, a single shaft 270 is rigidly coupled to each blade grip 234 such that shaft 270 intersects a pitch change axis 232. Shaft 270 is sized for insertion through hole 264 of ball 262. Each ball 262 is coupled to shaft 270 at the intersection of pitch change axis 232. When assembled, each damper assembly 258 can be rotated a limited amount relative to each blade grip 234, allowing for rotor blades 206 to rotate about pitch change axis 232 without materially affecting movement in lead and lag directions 224, 226 relative to each other and to yoke 210. The resistive force of each damper assembly 258 is transferred to each blade grip 234 through associated concentric rod end bearing 260, into shaft 270, and into adjacent blade grip 234 to resist relative motion between blade grips 234 and their associated rotor blades 206. Because concentric rod end bearings 260 are coupled directly to pitch change axis 232, the length of the lever arm between the resistive force and pitch change axis 232 is zero. Therefore, attachment directly to pitch change axis 232 effectively eliminates any rotational moments that may be caused by the transmission of force from damper assembly 258 to blade grip 234. Attachment directly to pitch change axis 232 eliminates the rotational moment, and therefore, greatly simplifies the dynamic calculations required to design and program the flight control system.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft rotor assembly, comprising:
   a yoke configured to be coupled to and rotate with a mast about a mast axis, the yoke defining a plurality of bearing pockets;
   a plurality of rotor blade assemblies, each rotor blade assembly comprising:
      a rotor blade;
      a bearing, wherein the bearing is at least partially disposed within one of the plurality of bearing pockets, the bearing forming a lead-lag hinge with a lead-lag axis that is substantially parallel to the mast axis, a flap hinge with a flap axis that is substantially perpendicular to and intersects the lead-lag axis, and a pitch change hinge with a pitch change axis that is substantially perpendicular to and intersects both the lead-lag axis and the flap axis; and
      a blade grip, the blade grip coupling the rotor blade to the bearing, the blade grip including a shaft between the yoke and the rotor blade, wherein the shaft intersects the pitch change axis; and
   a plurality of damper assemblies, each of the plurality of damper assemblies including a first end and a second end, the first end of each damper assembly and the second end of an adjacent damper assembly both being connected to a single concentric rod end bearing, each concentric rod end bearing comprising a ball and concentric inner and outer races, each race being connected to either the first end of one of the damper assemblies or to the second end of an adjacent damper assembly, each of the concentric rod end bearings being coupled to the shaft of one of the plurality of blade grips such that a center point of the ball of each of the concentric rod end bearings is approximately coincident to the pitch change axis of each of the plurality of rotor blade assemblies.

2. The aircraft rotor assembly of claim 1, wherein each of the plurality of damper assemblies do not include another joint between the concentric rod end bearings to which it is attached.

3. The aircraft rotor assembly of claim 1, wherein the blade grip includes a central portion connecting an upper plate of the blade grip to a lower plate of the blade grip, the central portion being located between the shaft and the rotor blade.

4. The aircraft rotor assembly of claim 1, further comprising:
a control system for collective and cyclic control of a pitch of each of the plurality of rotor blade assemblies.

5. The aircraft rotor assembly of claim 4, the control system, comprising:
a pitch horn coupled to each of the blade grips;
a swashplate; and
a pitch link coupled to each of the pitch horns and the swashplate, each of the pitch links being located closer to the mast axis than an outermost surface of the yoke.

6. The aircraft rotor assembly of claim 5, wherein each of the pitch links is located closer to the mast axis than the outermost portion of the bearing pockets.

7. The aircraft rotor assembly of claim 6, wherein the yoke is constructed of a composite material.

8. The aircraft rotor assembly of claim 7, wherein each of the plurality of rotor blade assemblies are able to rotate about the lead-lag hinge by at least 1 degree in a lead direction and at least 1 degree in a lag direction.

9. An aircraft, comprising:
a fuselage;
a powerplant;
a mast coupled to the powerplant; and
a rotor assembly, comprising:
a yoke coupled to the mast and being configured to rotate about a mast axis, the yoke defining a plurality of bearing pockets;
a plurality of rotor blade assemblies, each rotor blade assembly comprising:
a rotor blade;
a bearing, wherein the bearing is at least partially disposed within one of the plurality of bearing pockets, the bearing forming a lead-lag hinge with a lead-lag axis that is substantially parallel to the mast axis, a flap hinge with a flap axis that is substantially perpendicular to and intersects the lead-lag axis, and a pitch change hinge with a pitch change axis that is substantially perpendicular to and intersects both the lead-lag axis and the flap axis; and
a blade grip, the blade grip coupling the rotor blade to the bearing, the blade grip including a shaft between the yoke and the rotor blade, wherein the shaft intersects the pitch change axis; and
a plurality of damper assemblies, each of the plurality of damper assemblies including a first end and a second end, the first end of each of the plurality of damper assemblies and the second end of an adjacent damper assembly both being connected to a single concentric rod end bearing, each concentric rod end bearing comprising a ball and concentric inner and outer races, each race being connected to either the first end of one of the damper assemblies or to the second end of an adjacent damper assembly, each of the concentric rod end bearings being coupled to the shaft of one of the plurality of blade grips such that a center point of the ball of each of the concentric rod end bearings is approximately coincident to the pitch change axis of each of the plurality of rotor blade assemblies.

10. The aircraft of claim 9, further comprising:
a control system for collective and cyclic control of a pitch of each of the plurality of rotor blade assemblies.

11. The aircraft of claim 10, the control system, comprising:
a pitch horn coupled to each of the blade grips;
a swashplate; and
a pitch link coupled to each of the pitch horns and the swashplate, each of the pitch links being located closer to the mast axis than an outermost surface of the yoke.

* * * * *